United States Patent [19]
Klein et al.

[11] 3,745,519
[45] July 10, 1973

[54] SMALL CRAFT POSITIONING SYSTEM

[75] Inventors: Adolph H. Klein, Bryans Road; John D. Hoyt, Oxon Hill, both of Md.

[73] Assignee: The United States of America as represented by the Secretary of the Navy, Washington, D.C.

[22] Filed: June 3, 1971

[21] Appl. No.: 149,435

[52] U.S. Cl.................................. 340/3 E, 340/6 R
[51] Int. Cl.............................................. G01s 5/18
[58] Field of Search...................... 340/2, 3 E, 3 R, 340/5 R, 6 R; 343/112 C, 15; 235/150.27, 190, 191

[56] References Cited
UNITED STATES PATENTS

| | | | |
|---|---|---|---|
| 3,213,410 | 10/1965 | Hagemann | 340/3 E |
| 2,910,665 | 10/1959 | Hawkins | 340/3 E |
| 2,366,800 | 1/1945 | Norrman | 340/5 R |
| 3,421,138 | 1/1969 | Moulin et al. | 340/5 R |
| 3,226,719 | 12/1965 | Chown | 343/112 C |
| 3,460,060 | 8/1969 | Abruzzo et al. | 340/4 R |
| 3,515,342 | 6/1970 | Brunk | 235/150.27 |

Primary Examiner—Richard A. Farley
Attorney—R. S. Sciascia, J. A. Cooke, R. J. Erickson and D. McGiehan

[57] ABSTRACT

An automatic marine navigation system for use with small craft by reference to two fixed points. The fixed points may be moored sonar buoys which transpond acoustic pulses upon actuation by a radio frequency pulse from a remote transmitter on the craft. The time difference between the emitted radio frequency pulse and the received sonar pulse is measured for each buoy, and thence analyzed to obtain a rectangular co-ordinate plot of the small craft's position relative to the buoys.

2 Claims, 3 Drawing Figures

INVENTORS
JOHN D. HOYT
ADOLPH H. KLEIN
AGENT
BY
ATTORNEY 3,745,519

SMALL CRAFT POSITIONING SYSTEM

BACKGROUND OF THE INVENTION

This invention relates to an automatic navigation system and more particularly a portable system using two reference points and automatically converting the craft's distance from each point to X-Y coordinates in a rectangular area relative to the baseline between the two points. This area may be in a body of water where a search of the bottom is to be conducted.

Prior to this invention, the method for laying out and searching an undersea area was by staking out or anchoring a optically visible grid pattern near the bottom. The gride pattern was then used as a reference by divers searching the ocean floor. The method was slow and offered no assurance that the entire area has been searched because there was the possibility that the grid may have been moved by currents. More important, it is well known that visual reference to the grid lines by divers is difficult due to lack of acuity.

Small craft suitable for diver search operations are not equipped with sufficiently sophisticated navigation equipment to determine the craft's position with the desired accuracy of a few feet. Furthermore, conventional navigation equipment is complex and requires reference to shore stations remote from the search area further limiting accuracy obtainable.

SUMMARY OF THE INVENTION

Accordingly, an object of the instant invention is to provide a local navigation system.

A further object of the instant invention is to provide a navigation system to aid divers in accurately searching the ocean floor.

A still further object of the present invention is to provide a navigation system for a small craft that is accurate, simple, and self-contained.

An additional object of the instant invention is to provide a portable navigation system which is readily deployed for precise local navigation within any preselected navigable waters.

These and other objects are attained by providing a local, portable, and self-contained navigation system having the desired accuracy for establishing the position of a small craft utilizing a transmitter on the craft, transponders at remote fixed points, and a craft mounted receiver and computer to process the time delayed signals from the transponders into a rectangular coordinate plot of the crafts position.

BRIEF DESCRIPTION OF THE DRAWINGS

A more complete understanding of the invention and many of the attendant advantages thereof will be readily appreciated as the same becomes better understood by reference to the following description when considered in connection with the accompanying drawings wherein.

DESCRIPTION OF THE PREFERRED EMBODIMENT

Figure 1:
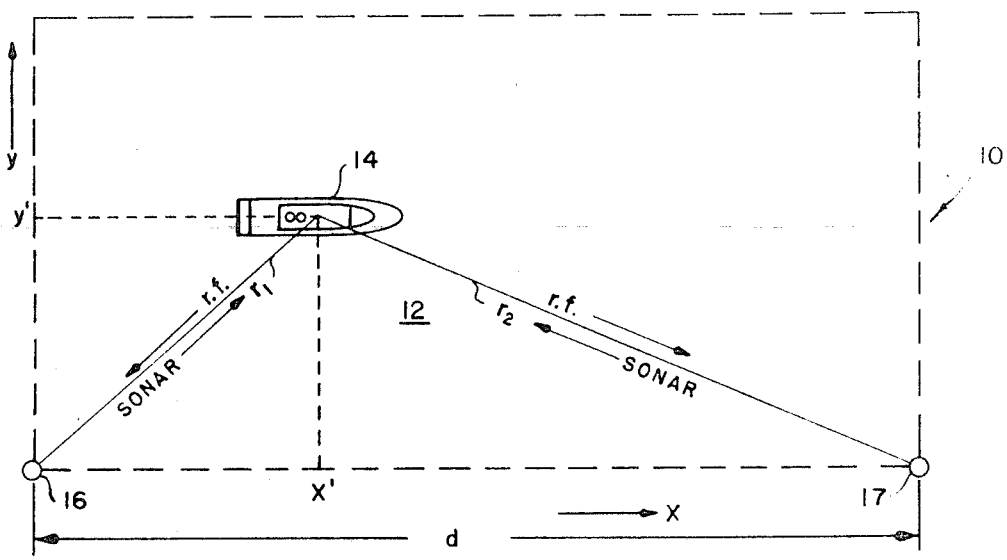
FIG. 1 is a plan view of a typical area layed out for local navigation according to the invention.

Referring now to the drawings wherein like reference numerals designate corresponding parts in the several views, and more particularly to FIG. 1, there is shown generally a rectangular area 10 layed out for navigation and showing a navigation system 12 including a small craft 14 and taut moored sonar buoys 16 and 17 used as reference points. The distance from the buoy 16 to the small craft 14 is designated $r_1$ as a radius and the distance from buoy 17 to the small craft 14 is designated $r_2$, also a radius. These distances may be converted to coordinates X, and Y, as related to the base line between the buoys to define the position of the small craft 14 as described hereinafter. The buoys 16 and 17 are moored at desired locations and separated by a distance designated d and determined during the setup phase of the search operation.

Figure 2:
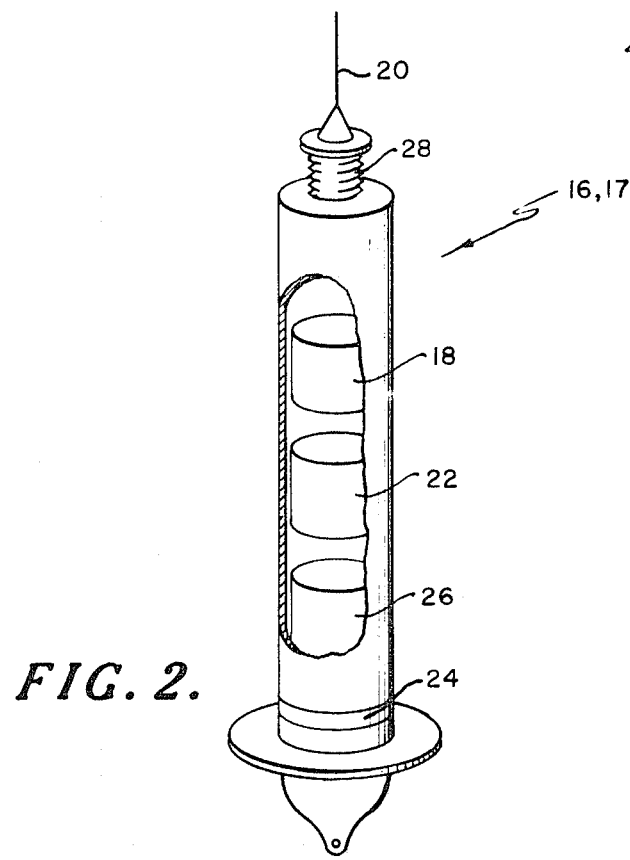
FIG. 2 is a side view partially cut away showing a sonar buoy used as a reference point in the navigation system.

Referring now to FIG. 2, each of identical buoys 16 and 17 has a radio frequency receiver 18 and a receiving antenna 20 which will receive a transmitted pulse from the small craft 14. Also contained in the buoys 16 and 17 is a sonar transmitter 22 activated by the receiver 18, and subsequently driving an omnidirectional ultrasonic transducer 24. A rechargable battery pack 26 is installed to power both the receiver 18 and the sonar transmitter 22. A light beacon 28 is provided on each bouy 16 and 17 to aid visual location after a search is completed.

Figure 3:
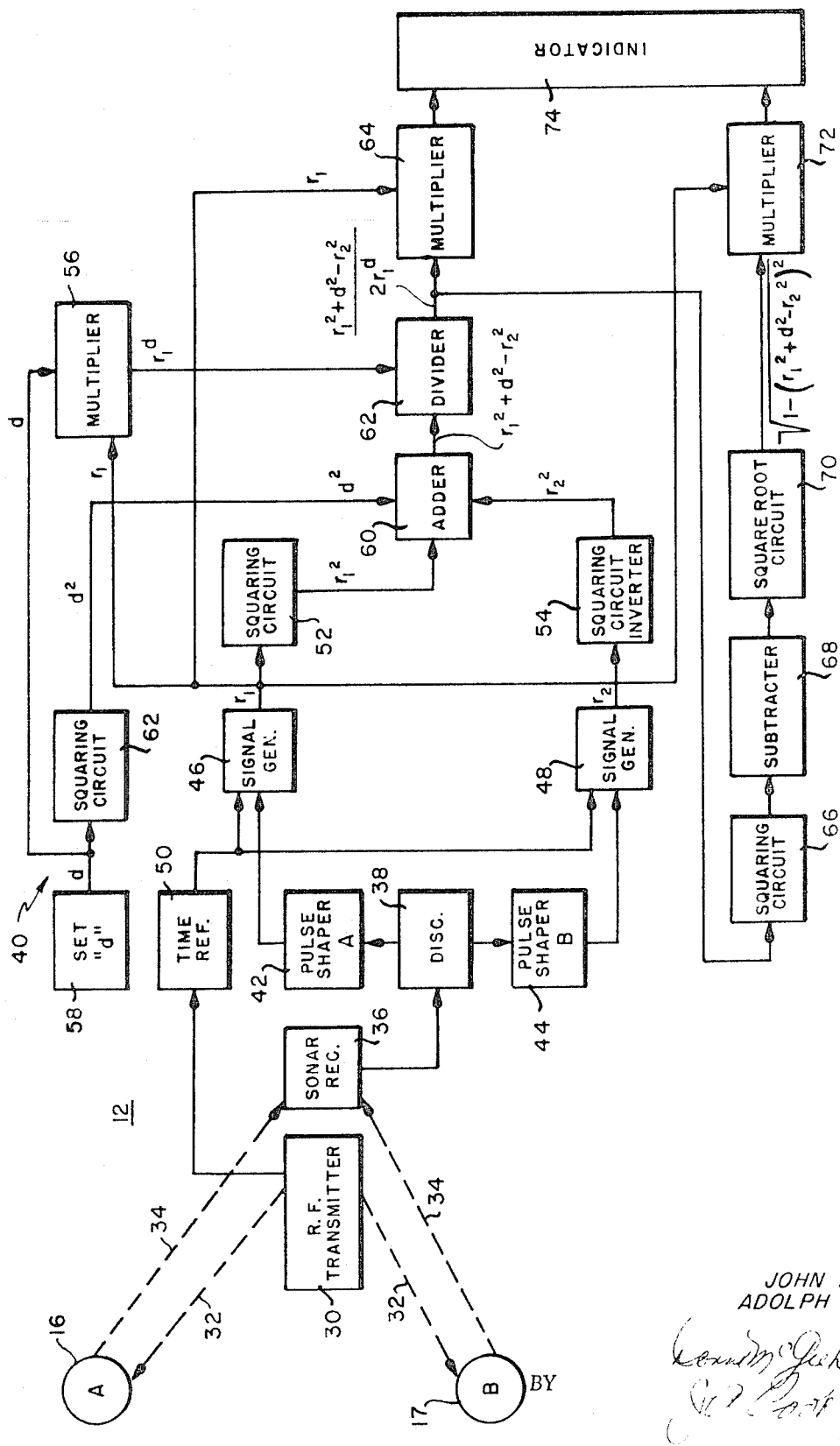
FIG. 3 is a block diagram of the complete navigation system showing how the position of the craft in X-Y coordinates is obtained.

Referring now to FIG. 3, the small craft 14 has mounted on board a radio frequency transmitter 30 which transmits a pulse modulated continuous wave signal over path 32 to the buoy receivers 18 and a reference signal into a computer 40. These receivers 18 trigger the buoy sonar transmitters 22 and piezoelectric transducers 24 emit omnidirectional tone-coded sonar signals over path 34. A sonar receiver 36 via a hydrophone (not shown) on the small craft 14 receives the sonar signal after a transit time delay. The received signals are then injected into a discriminator 38 which separates the signals received from buoys 16 and 17 and applies them to pulse shaping circuits 42 and 44 respectively.

These pulse shapers 42 and 44 exaggerate the leading edges of the pulses and applies them to linear saw tooth generators 46, 48. Also injected into the generators 46, 48 is a signal from a time reference generator 50 keyed by a signal from transmitter 30. The mixing of these signals in generators 46 and 48 create output voltages $r_1$ and $r_2$, which are proportional to the time differences between the time reference signal and each of the received and processed signals from buoys 16 and 17 individually.

The voltages $r_1$ and $r_2$ are each squared in respective squaring circuits 52 and 54. Voltage $r_1$ is also fed to a multiplier circuit 56 where it is combined with a voltage $d$ from set "d" circuit 58. Voltage $d$ from the set"d" circuit 58 is set by the operator and represents the distance between buoys 16 and 17 as described earlier. The output $r_1^2$ from squaring circuit 52 is fed to an adder 60. Voltage $d$ from the set-"d" circuit 58 is squared in a squaring circuit 62 and the result is also applied to adder 60. A squaring and inverting circuit 54 squares and inverts $r_2$ to produce voltage $-r_2^2$ which is also applied to adder 60.

All three signals are combined in an Adder 60 to produce $(r_1^2 + d^2 - r_2^2)$ which is divided by $2r_1d$ in a divider circuit 62. The quantity $(r_1^2 + d^2 - r_2^2)/2r_1d$ is multiplied by $r_1$ in a multiplier 64 producing a d.c. voltage representing the X positive of the small craft 14. This voltage is updated every second.

The output of divider 62 is also fed to and squared in squaring circuit 66. The square is subtracted from 1 in subtracter circuit 68, and that result $1 - [r_1^2 + d^2 - r_2^2)^2]/2r_1d]^2$ is squarerooted in square root circuit 70. The output from square-root circuit 70 is multiplied by $r_1$, derived from the signal generator 46, in multiplier 72 producing a d.c. voltage representing the y position of the small craft 14.

The output voltage from multiplier 64 represents an x position and is equal to $r_1 [(r_1^2 + d^2 - r_2^2)/2r_1d]$. The output voltage from multiplier 72 represents a y position and is equal to $r_1 \sqrt{1 - (r_1^2 + d^2 - r_2^2)/2r_1d]^2}$. These voltage outputs may be fed to an indicator 74 such as for example an X-Y plotter to provide a real-time navigational plot of the craft's position as it searches the local area previously layed out.

Obviously numerous modifications and variations of the present invention are possible in light of the above teachings such as transmitting a sonar pulse from the craft and receiving a transponded radio frequency signal from the buoy, or placing the sonar transducers in the buoy anchors. It is therefore understood that within the scope of the appended claims the invention may be practiced otherwise than as specifically described.

What is claimed as new and desired to be secured by Letters Patent of the United States is:

1. A navigation system for determining in real-time a craft's position within a predetermined area comprising:
   a radio frequency transmitter operable on the craft for emitting timed pulse signals;
   a pair of transponders actuatable by said transmitter for receiving and subsequently retransmitting with underwater acoustic signals the timed pulse signals;
   an underwater acoustic receiver operable on the craft for receiving the delayed retransmitted pulses from said pair of transponders;
   a computer operable on the craft and coupled to said receiver for processing the received signals and producing a voltage $r_1 [(r_1^2 + d^2 - r_2^2)/2r_1d$, representing the x coordinate position and a voltage $r_1 \sqrt{1 - [(r_1^2 + d^2 - r_2^2)/2r_1d]^2}$ representing the y coordinate position of the craft where $r_1$ and $r_2$ represent the radial distances from the craft to each of the pair of transponders, and d represents the distance between the pair of transponders; and
   an indicator connectable to the output of said computer for translating said voltages into a display of the craft's position.

2. The navigation system of claim 1 wherein each of said transponders comprises:
   a radio frequency receiver mounted in a floating moored buoy; and
   an underwater acoustic transmitter coupled to said receiver is mounted at an anchor of said floating moored buoy.

\* \* \* \* \*